United States Patent [19]

Durrell

[11] Patent Number: 5,193,641
[45] Date of Patent: Mar. 16, 1993

[54] ANTI-THEFT VEHICLE SYSTEM AND METHOD

[75] Inventor: Robert R. Durrell, Redwood City, Calif.

[73] Assignee: Quantic Industries, San Carlos, Calif.

[21] Appl. No.: 753,337

[22] Filed: Aug. 30, 1991

[51] Int. Cl.⁵ .............................................. B60R 25/00
[52] U.S. Cl. ...................................... 180/287; 70/237; 180/272
[58] Field of Search .................... 180/287, 272; 70/237

[56] References Cited

U.S. PATENT DOCUMENTS

| | | | |
|---|---|---|---|
| 4,566,556 | 1/1986 | Wodeslavsky | 180/287 |
| 4,835,533 | 5/1989 | Akutsu | 180/287 |
| 5,006,843 | 4/1991 | Hauer | 180/287 |
| 5,043,593 | 8/1991 | Tsutsumi et al. | 180/287 |

*Primary Examiner*—Kenneth R. Rice
*Attorney, Agent, or Firm*—Flehr, Hohbach, Test, Albritton & Herbert

[57] ABSTRACT

An anti-theft system and method for automobiles cuts off the fuel supply from the gas tank by not opening a cutoff valve if a car has been improperly started. Auxiliary units associated with the ignition and the gas tank require that a certain timing sequence be gone through in starting; if the key is accidently left in the ignition for an extended period of time, the fuel will be shut off, or if the car is hot wired, the fuel will be shut off. In either case, an operator's personal code must be re-entered.

9 Claims, 5 Drawing Sheets

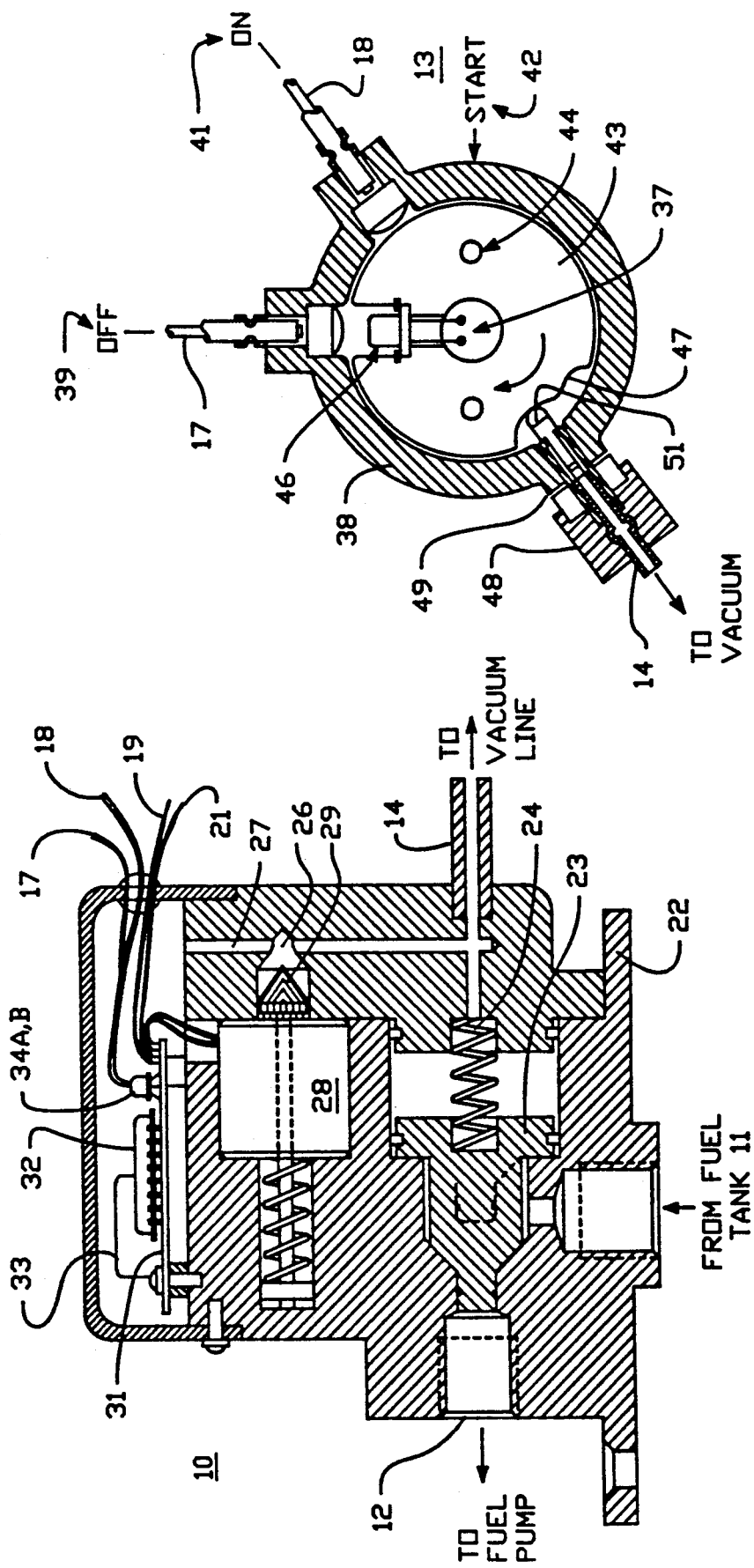

ANTI-THEFT VEHICLE SYSTEM AND METHOD

The present invention is directed to an anti-theft vehicle system and method and specifically for a vehicle with an internal combustion engine where the fuel supply is cut off where a theft related technique is used to start the vehicle such as "hot wiring" or the key being accidentally left in the ignition.

BACKGROUND OF THE INVENTION

Cutting off or disabling the fuel supply of a stolen vehicle is well known. For example, a very simple system which restricts fuel flow to the engine is the key operated valve in the fuel line shown by Bradley U.S. Pat. No. 4,084,657. McKinnon U.S. Pat. No. 4,107,962 shows the use of a concealed switch which prevents the fuel pump from operating and which times out to cut out the fuel after the vehicle has only been driven a relatively short distance. The Garreto U.S. Pat. No. 4,991,683, as well as Sangster U.S. Pat. No. 3,834,484, both require that a code be entered into the system via a keyboard or key pad; in Garretto if the code is not entered, power is disrupted to either the ignition coil, fuel pump or a fuel flow valve. In Sangster a valve is opened in the fuel line adjacent the carburetor. All of the foregoing systems are "non-passive" in that they require entry of a code or turning of a special key or hidden switch. Thus they are inconvenient to the user. In addition to the non-passive nature, the systems may be defeated with relative ease. For example, in the Bradley patent with the key operated switch, the cable at the end of the switch can be disconnected and manually rotated. In the case of McKinnon, even though the switch is "hidden", if it is found it can easily be operated. If located in the trunk for example, the trunk lid can easily be pried up. In the case of the Sangster coding device, the actual code unit can be opened and readily defeated. Finally, the Garretto disclosure operates by shutting power off to various components; this means the shut off component can be easily hot wired from the battery.

OBJECT AND SUMMARY OF THE INVENTION

It is therefore an object of the present invention to provide an improved anti-theft method and apparatus for a vehicle.

In accordance with the above object, an anti-theft method for a vehicle is provide where the vehicle has an internal combustion engine with a fuel tank and where the anti-theft technique is disabling the fuel supply from the tank to the engine. The engine will typically have an ignition system with a normal start up procedure including insertion of a key into an ignition switch (OFF position), placing the ignition switch in a stable ON condition, and temporarily placing the ignition switch in a start condition to actuate a starting motor and then allowing the switch to resume its stable ON condition. The method includes the steps of sensing the insertion of the key and timing such insertion. The engine is started by temporarily placing the ignition system in the start condition. Thereafter a first vacuum relief valve is closed which is connected to the intake manifold vacuum of the engine, if the timing indicates less than a predetermined duration to allow the manifold vacuum of the engine to enable the fuel supply from the tank to the engine. From a more detailed aspect, photodiode means are used for the timing circuit and a second vacuum relief valve is connected to the ignition switch.

BRIEF DESCRIPTION OF THE DRAWINGS

FIG. 2 is a cross sectional view of a portion of the invention associated with the fuel tank of the vehicle.

FIG. 3 is a cross sectional view of a portion of the invention associated with the ignition switch of the vehicle.

DESCRIPTION OF PREFERRED EMBODIMENT

Figure 1:
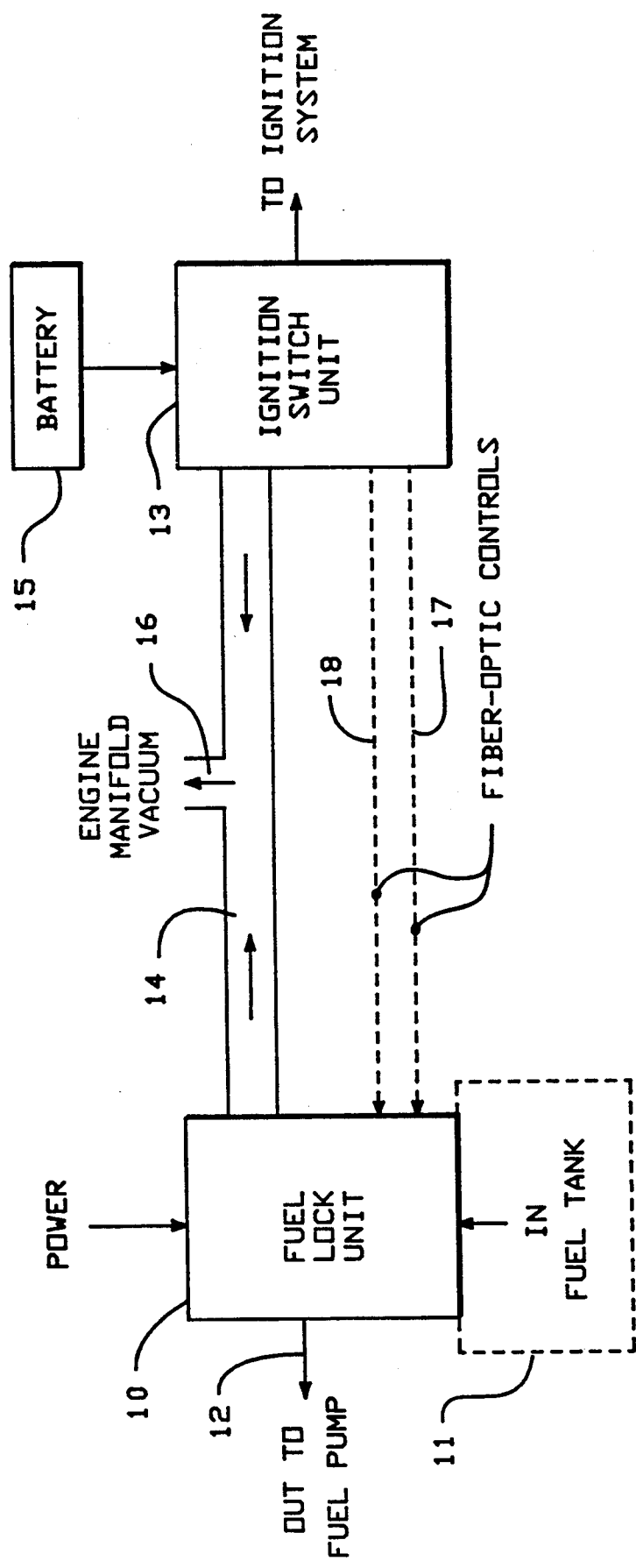
FIG. 1 is a schematic block diagram showing how the method and system would be used on a vehicle.

FIG. 1 illustrates the placement of the two units of the invention along with their linking vacuum and fiber optic lines in a standard automobile. A fuel lock unit would be installed on a gas or fuel tank 11 (in the automobile) and interposed in the existing fuel line 12 which goes to the fuel pump in the engine compartment. The second unit, the ignition switch unit 13, either can replace the steering column lock in original equipment applications, or alternatively, be connected in series with the existing steering column lock on retrofit applications. Connecting units 10 and 13 are a vacuum line 14 which is connected to the intake manifold of the engine as illustrated at 16 and a pair of fiber optic control lines 17 and 18.

FIG. 2 illustrates the fuel lock unit 10 where the input to the unit is from fuel tank 11 and includes the output of fuel port 12 and then the vacuum line is indicated at 14. The fiber optic links are shown at 17 and 18 and a power input from the automobile battery 15 by a positive "input" on line 19 and ground at 21.

The fuel lock unit 10 is mounted on the fuel tank by the fitting 22. The connection between fuel tank 11 and fuel pump line 12 is made by closing a vacuum controlled poppet valve 23 which is springloaded in the normally open position by spring 24 but which is actuated to close or enable the fuel line by the enabling of the vacuum in the vacuum line 14. A vacuum relief valve 26 normally vents the vacuum line 14 to ambient air through the channel 27 unless a solenoid 28 is operated to interrupt or seal channel 27 by movement of piston 29. Solenoid 28 is connected to a printed circuit board 31 which includes a hybrid micro-circuit 32, a keep-alive capacitor 33 and a pair of photodiodes 34A, 34B, which are connected to the fiber optic links 17 and 18, respectively.

In general, solenoid 28 is energized by the logic functions of the hybrid circuit 32 to close the first vacuum relief valve 26 only if certain optical conditions of photodiodes 34A and 34B are met.

The other unit, ignition switch unit 13, is illustrated in FIG. 3 and is shown as being ganged to or in series with the existing shaft 37 of the typical ignition switch of an automobile. Shaft 37 rotates in a direction shown by the arrow 38 from an OFF position 39 to an ON position 41 and then to a start position 42. They are all well known positions (or conditions) of a typical automobile ignition switch. However, summarizing briefly, in the OFF position the key is inserted in the ignition switch and then it is turned to the ON position 41 where the battery power is connected to the overall ignition system of an automobile and then, of course, the starting motor is energized in a start position 42.

The rotor 43 is coupled to the shaft 37 by two drive pins 44 and carries with it a light emitting diode (LED) 46 which illuminates in the OFF position 39 the fiber optic 17, in the ON position 41 the fiber optic 18, and in the start position 42, neither is illuminated; thus, the rotation of the LED can also be thought of as opening and closing of shutters against the fiber optic links.

Rotor 43 also contains an integral cam section 47 which in the illustrated OFF position allows an associated vacuum relief valve 48 to be opened and vented through six vents 49. The vacuum relief valve is, of course, coupled to the vacuum line 14. Movement of rotor 43 out of the OFF position to either ON or start closes this relief valve 48 by moving its piston 51.

Figure 4:
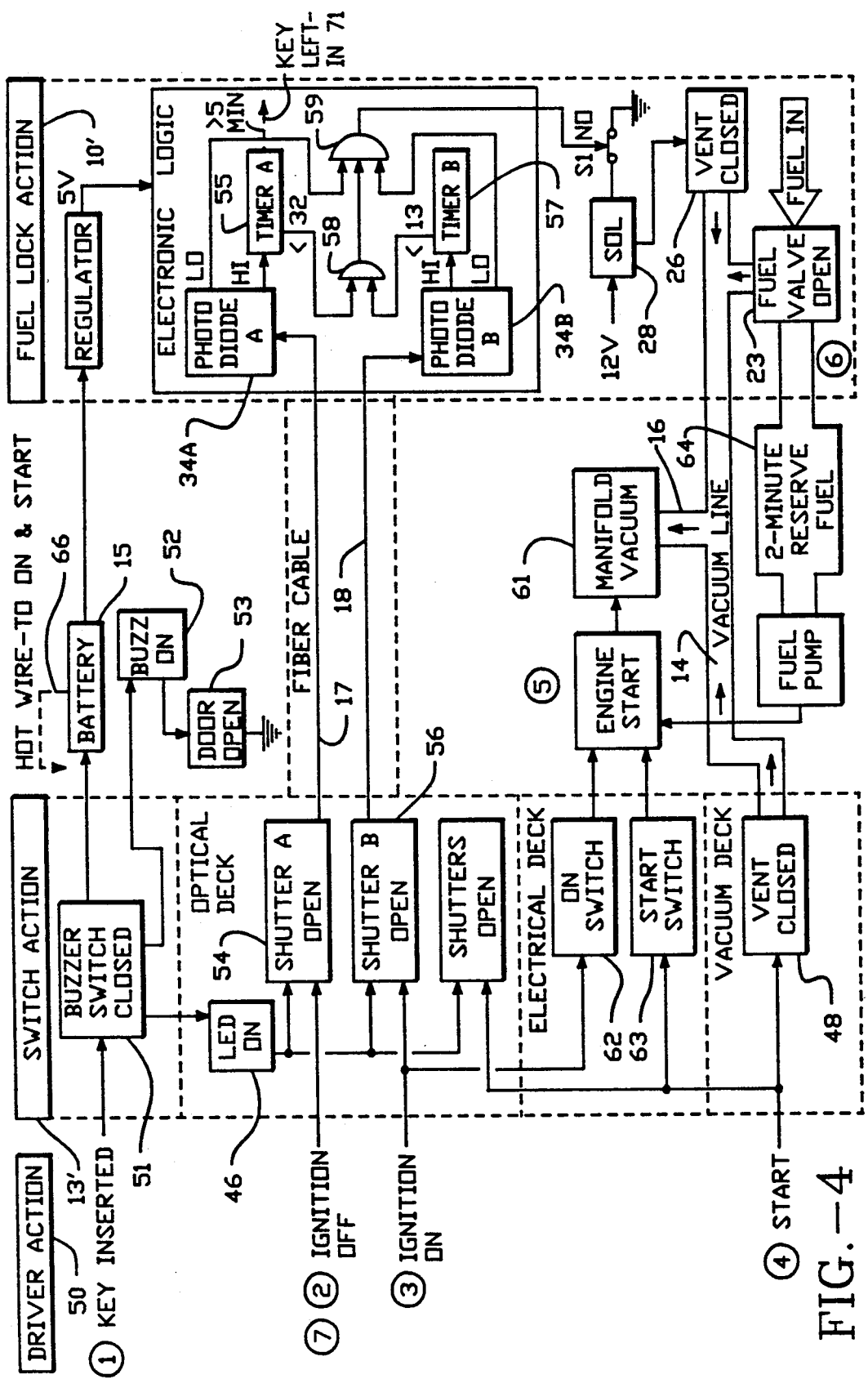
FIG. 4 is a functional block diagram showing the operation of the invention.

As discussed above, the anti-theft system of the present invention is normally passive or transparent to the driver. FIG. 4 illustrates from a functional standpoint (along with actual mechanical and electrical components illustrated) the normal function of the anti-theft system with the driver action being listed in column 50, the ignition switch action in column 13' and the fuel lock action in column 10'. Circled numbers 1 through 7 correspond to the steps in the sequence of operation.

In step 1, the key is inserted in the ignition switch which enables a buzzer switch 51 (an existing part of the key lock) and will normally actuate the buzzer as shown by buzz on 52 if the door is open as shown at 53. However, the buzzer or key switch 51 (also see FIG. 5) is used to illuminate the light emitting diode 46 (see also FIG. 3).

In step 2, with the key inserted and the ignition still off, the LED 46 will illuminate the fiber optic cable 17 in function block 54 as "shutter A open". Thus the associated photodiode 34A, under the fuel lock action, 10' is high. This starts the timer A (55) which times out in 32 seconds. In other words, within this time duration, the engine must be started or the ignition switch must be switched to ON. If this does not occur, the driver realizes he left the key in the switch and then the key must be removed and the process restarted.

In step 3, the ignition is turned on and referring to FIG. 3 this means that the light emitting diode 46 is moved to the fiber optic link 18 illuminating the photodiode 34B via the link 18. Thus as indicated by the function block 56, shutter B is opened meaning that photodiode 34B is high and thus timer B(57) starts. Again as in the case of timer A, the ignition must be switched to the start position but within 13 seconds. When both of these conditions are met, timer A less than 32 seconds and timer B less than 13, the AND gate 58 is actuated. Thereafter in step 4 in the start position, the photodiodes 34A and 34B go low and thus the triple input AND gate 59 is actuated to close the normally open (NO) switch or field effect transistor (FET) S1, connecting the ground side of solenoid 28 thereby causing it to actuate and to close the vent relief valve 26 (see FIG. 2). At the same time, when the ignition was turned on, the vacuum relief vent 48 was closed to thus allow the manifold vacuum indicated at 61 through its port 16 to place a vacuum on vacuum line 14.

In step 5 the engine starts due to the ON switch 62 and the start switch 63 of the standard existing ignition being closed. With the engine starting, a two-minute fuel reserve shown at 64 is used. The fuel reserve could be the remaining fuel in the carburetor or in a fuel filter.

In step 6 when the engine vacuum takes effect due to manifold vacuum 61, the fuel poppet valve 23 opens as described in conjunction with FIG. 2 since the vacuum line will overcome the effect of the spring 24. In step 7 when the ignition is turned off, the vacuum drops and the fuel valve 23 closes to disable the fuel flow.

Thus the anti-theft system when a normal non-theft start by the owner is conducted, allows the engine to start in a totally passive or transparent mode to the driver.

When a theft occurs and the battery 15 is hot wired to the ON and start switches 62 and 63, as indicated by the dashed line 66 from the battery, this means the key is not in the ignition switch and of course the ignition switch is in the OFF position (step 2). Thus both vacuum relief valves or vents 26 and 48 will remain open; in the case of relief valve 26, both photodiodes 34A and 34B remain low so as not to actuate AND gate 58. In addition the second relief valve 48 remains open since the ignition cam (cam 47 in FIG. 3) has not rotated. The fuel valve 23 remains open. The engine will start but after the two-minute fuel reserve is used, the engine stops and cannot be restarted without an operator's personal code(OPC) which will be discussed in conjunction with FIG. 5.

Figure 5:
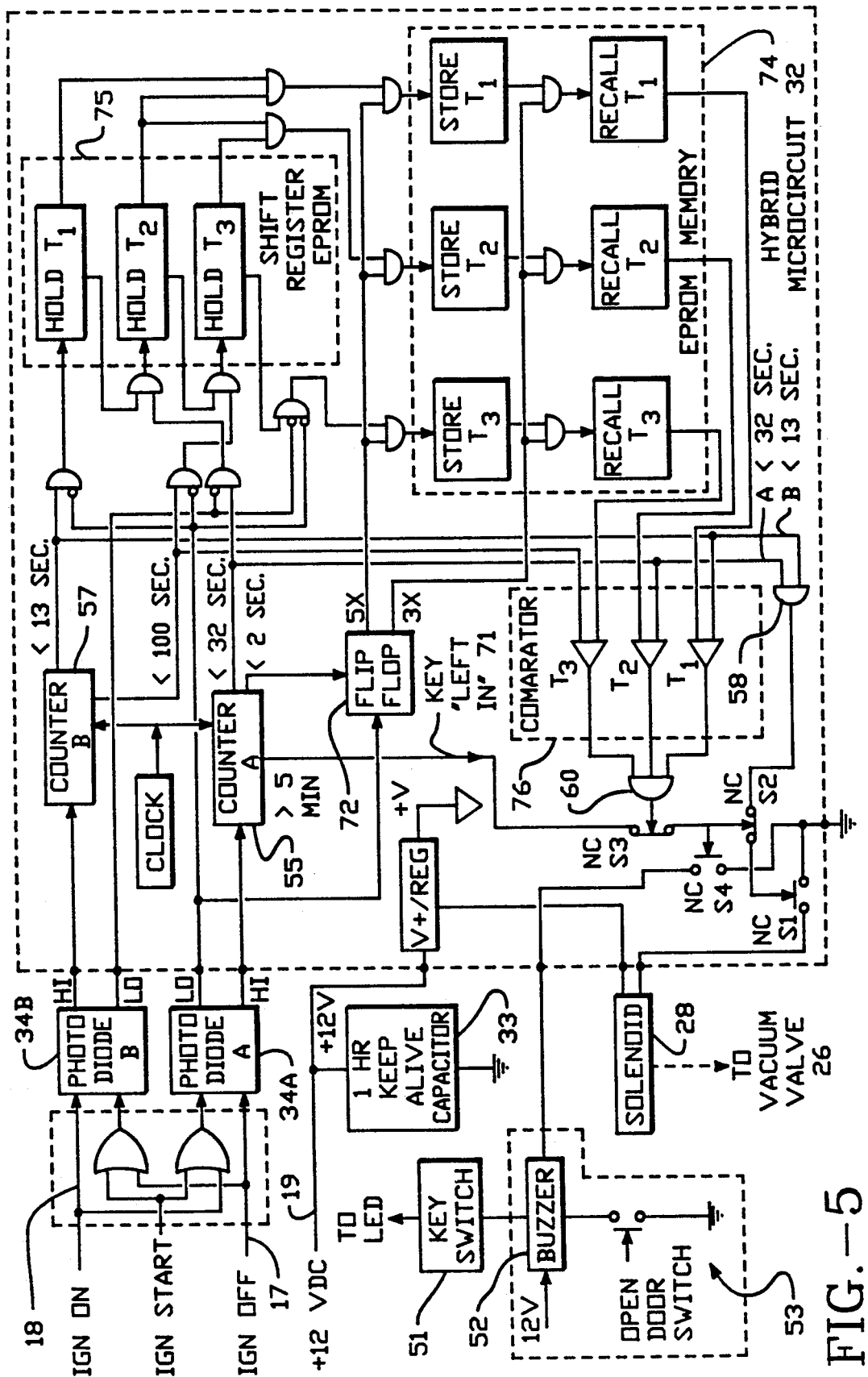
FIG. 5 is a circuit block diagram used to implement the function of FIG. 4.

In the anti-theft mode, where the key is left in the ignition for greater than 5 minutes, timer A (55) as shown by the dashed line 71 and designated "key left in", in effect permanently disables vacuum relief valve 26 discussed in conjunction with FIG. 5. What is important is that in step 3, after 32 seconds has elapsed and the ignition is turned on, AND gate 58 cannot be enabled and thus vacuum relief valve 26 cannot be closed. However, if the time is less than five minutes, the key can be removed and the entire process started over. This allows for the car to be left temporarily with the key in it without any undue procedures required. However, as discussed below, after five minutes, the operator's personal code must be re-entered correctly to re-initialize the system. Without the relief valve 26 closed, then of course, if the car is started and moved, it will stop when the two minute reserve fuel is used. To prevent this from happening to the actual operator of the car, the output 71 from timer A is also connected to the buzzer on unit 52 which will buzz continuously even with the door closed so that the user realizes this is a problem. In other words, the door buzzer will be activated even though the door is not open.

FIG. 5 shows the actual electronic circuit, namely, hybrid microcircuit 32, which implements the actions or the functions of FIG. 4. The inputs are, of course, the fiber optic lines 17 and 18 which actuate the photodiodes 34A and 34B. The logic function is illustrated between ignition ON, OFF and start by the use of the OR gates. Thus the photodiodes have the various high/low conditions already discussed in conjunction with FIG. 4. Counter A and counter B (55, 57) are actually the timers already discussed in Figure 4. Counter A(55) has both a less than 32 second output as discussed which drives the illustrated AND gate, a greater than five minute output which is the key left in line 71, and a less than 2 second output which drives a flip flop 72. The various outputs of the counters are fed through the AND gates shown to a shift register 75 having hold registers where T1 which is for the >13 second time, T2 for the >32 second time, and T3 for the >100 second time. Their outputs are transferred by the various gates to the EPROM memory 74 which via the flip flop unit 72 stores the holding unit outputs. Then these may be recalled by another output of the flip flop unit to be coupled to the comparator unit 76. The comparator has three gates, each corresponding to T1, T2, or T3. The other inputs of the comparator are coupled to the outputs of the counters 55 and 57. These drive a gate 60 which is used in a recovery function to be described with FIG. 6. Memory 74 is for the purpose of serving the operator's personal code (OPC).

The key left-in output 71 is produced by the counter 55. If greater than five minutes, it closes the switch S4 which is normally open and opens S2. When closed, the buzzer 52 is actuated and coupled to ground. This insures that the user realizes that the car should not be started and that the system must be re-initialized. AND gate 58 shows the normal operation of the device where both timings are within the required duration. The AND gate has an output which extends through the normally closed switch S2 (which is open if the five minute interval is exceeded) and which goes to the normally open switch S1 to close it to activate solenoid 28 and the vacuum relief valve 26. If the time interval is after 32 seconds but less than five minutes the driver simply removes and reinserts the key to start a new >32 second timeout.

Figure 6:
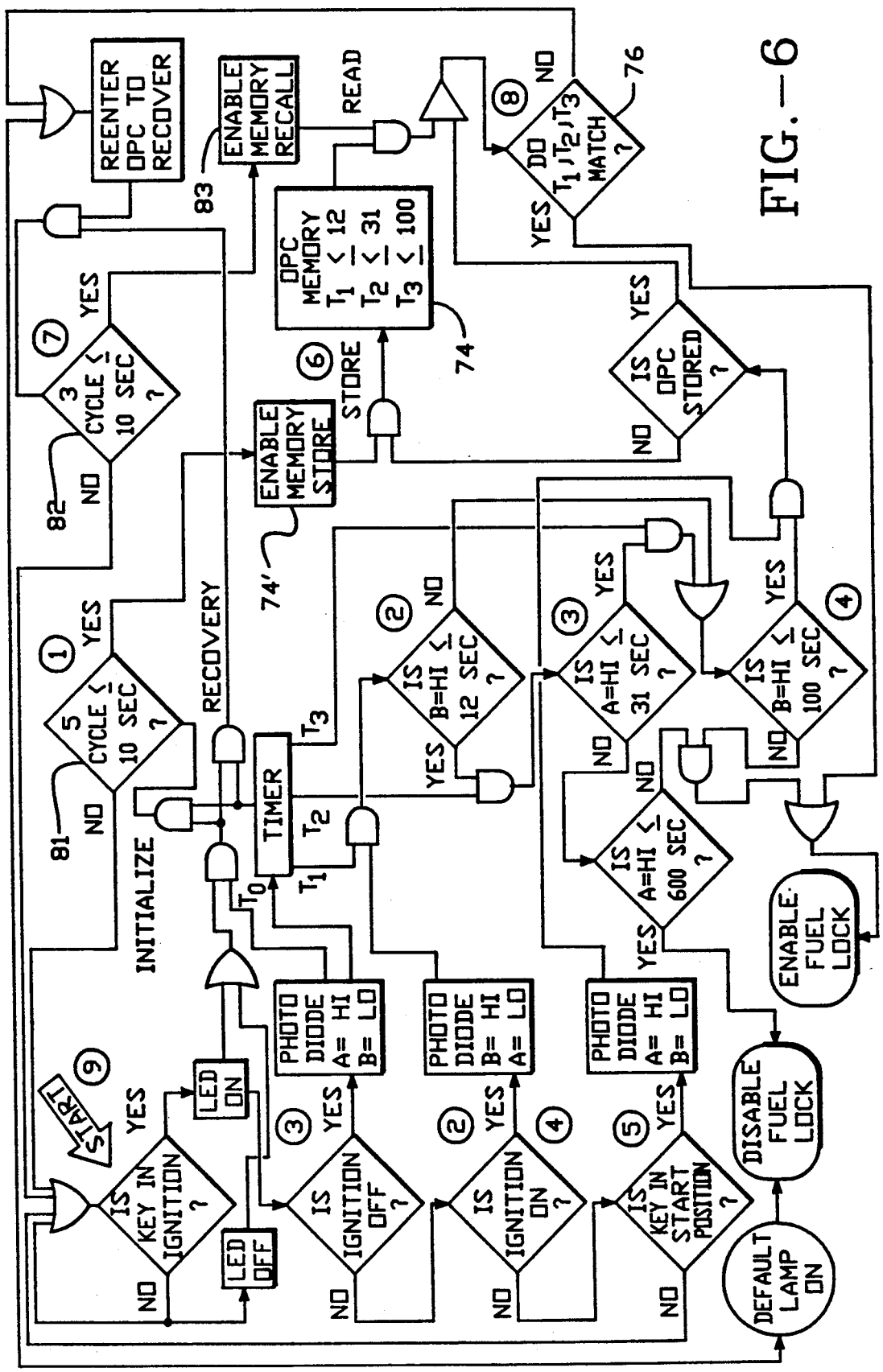
FIG. 6 is a flow chart showing the operation of the circuit of FIG. 5 in two modes of the invention.

FIG. 6 illustrates the initialization of the system and recovery mode which is necessary whenever a key is left in the ignition greater than five minutes or the car is hot wired. FIG. 6 illustrates the various steps in initialization by circled numerals. In step 1 the key is inserted in the ignition and partially removed five times within ten seconds. This starts the initialization process in step 81, that is, five cycles in less than ten seconds and the EPROM memory store unit 74 is enabled as shown in step 74'. The reason for this is that the photodiode A goes high each cycle and the flip flop 72 illustrated (see FIG. 5) produces an output with five cycles to enable the associated AND gates. In step 2 the ignition is switched ON for 1 to 12 seconds which may correspond to the owner's or the vehicle operator's month of birth. Here the photodiode B goes high causing the counter B (57) to count to T1 which is equal to or less than 12 seconds. This is held in the EPROM shift register memory 75 shown in FIG. 5. In step 3 the ignition is switched to OFF for 1 to 31 seconds (corresponding to the owner's day of birth) and photodiode B goes low and photodiode A goes high. Thus the counter A counts to the time interval T2 which is held in the shift register 75. T1 plus the T2 enable stores the T1 in the EPROM memory 74. This is better illustrated in FIG. 5. Next in step 4, the ignition is switched ON for 1 to 99 seconds (corresponding to the last two digits of the owner's year of birth). Here the photodiode A goes low and the photodiode B goes high. The counter B counts to T3. T3 is held in the EPROM shift register 75. T2 plus T3 plus enable stores T2 in EPROM memory 74. In the next step 5 the ignition switch is switched to the start position where photodiode A goes low and photodiode B stays low. Here the T3 plus the A and B low stores T3 in the EPROM memory 74.

In step 6 the combination of the three times, T1, T2, T3, provide the operator's personal code (OPC) but may never be entered again unless the car is stolen, by hot wiring, or the key is left in the ignition for more than five minutes in the OFF position.

The foregoing was the initialization mode. In case the car was stolen or the key left in as recited above then the recovery mode must be gone through. This begins with step 7 where the key is inserted and partially removed three times within ten seconds as shown by the functional unit 82. Here the photodiode A goes high each cycle and the flip flop 72 enables the memory recall at three cycles as shown in step 83.

In step 8 the operator's personal code is re-entered by going through such steps 2 through 5, except that T1, T2 and T3 are now compared against the stored T1, T2 and T3 which were initially stored in EPROM memory 74. This is done by the comparator unit 76 (see FIG. 5). If the re-entered OPC matches the stored OPC, the logic including AND gate 60 re-enables the solenoid 28 by opening the field effect transistor IID. This causes the switch S2 to be closed (as it was previously opened by the key left in output on line 71) and shuts off the buzzer by opening FET S4. The system is now, as shown in step 9, returned to normal functioning. Thus the optical code is re-entered or initialized by the above repetitive sequences of ON-OFF conditions including the removal of the key.

Thus an improved anti-theft system has been provided. The use of the vacuum line with two relief valves and the fiber optic links makes it difficult to defeat. However, in some cases, electrical wiring might replace one or both fiber optic links.

What is claimed is:

1. An anti-theft method for a vehicle having a internal combustion engine with a fuel tank and which disables the fuel supply of the tank to the engine, the engine having an ignition system with a normal start-up procedure including insertion of a key into an ignition switch (OFF condition), placing the ignition switch in a stable ON condition, and temporarily placing the ignition switch in a start condition to actuate a starting motor and then allowing the switch to resume its stable ON condition comprising the steps of:

sensing said insertion of said ignition switch key and timing such insertion;

starting said engine by temporarily placing said ignition system in said start condition;

thereafter closing a first vacuum relief valve, which is connected to the intake manifold vacuum of the engine, if said timing indicates less than a predetermined duration, to allow the manifold vacuum of the engine to enable the fuel supply from the tank to the engine but allowing said relief valve to remain open to disable said fuel supply if said timing indicates greater than said predetermined duration.

2. An anti-theft method as in claim 1 including the step of closing a second vacuum relief valve, which is connected to the intake manifold vacuum of the engine, in response to said ON condition.

3. An anti-theft method as in claim 2 where said ON condition, prior to said start condition, is timed also and if less than a predetermined duration allows said manifold vacuum to enable said fuel supply but if greater than said duration continues to disable said fuel supply.

4. An anti-theft method as in claim 1 including timing said key insertion for another predetermined duration significantly longer than said original predetermined duration for permanently disabling said first vacuum relief valve.

5. An anti-theft method as in claim 4 including the step of entering an operator's personal code (OPC) to cancel said permanent disabling.

6. An anti-theft method as in claim 5 where said OPC is entered by a timed repetitive sequence of ON-OFF conditions accomplished by the operator.

7. An anti-theft method as in claim 4 where said vehicle includes a "door open" buzzer which is normally activated when the vehicle door is open with the key left-in including the step of activating said buzzer after said another significantly longer predetermined duration even with the door closed.

8. Anti-theft apparatus for a vehicle having an internal combustion engine with a fuel tank and which disables the fuel supply from the tank to the engine, the engine having an ignition system with a normal start-up procedure including insertion of a key into an ignition switch (OFF condition), placing the ignition switch in a stable ON condition, and temporarily placing the ignition switch in a start condition to actuate a starting motor and then allowing the switch to resume its table ON condition, said apparatus comprising:

photodiode means associated with said ignition switch for indicating the said key inserted condition with said ignition OFF, the ignition ON condition, and the start condition;

a timing circuit responsive via first and second fiber optic links to said photodiode means, for timing the duration of said key insertion, and said ignition ON condition;

vacuum means connected to the intake manifold vacuum of said engine;

first and second vacuum relief valves connected to sid vacuum means, said second relief valve being closed in response to the ignition switch being placed in said ON condition;

means responsive to said duration being less than a predetermined maximum for closing said first relief valve to enable said vacuum means and responsive to said duration being longer than said predetermined maximum for maintaining said first relief valve open thereby disabling said fuel supply;

and solenoid means coupled to said vacuum means and activated by the vacuum of said engine when started, with first and second relief valves being closed, for completing the fuel supply line between said fuel tank and said engine.

9. Apparatus as in claim 8 including an ignition switch unit directly connected to said existing ignition switch of said vehicle, which contains said photodiode means and said second vacuum relief valve, and including a fuel lock unit attached to said fuel tank, which contains said solenoid means and said first vacuum relief valve;

said units being connected together by said vacuum means and said fiber optic links.

* * * * *